United States Patent
Ichinose et al.

(10) Patent No.: US 9,025,209 B2
(45) Date of Patent: May 5, 2015

(54) IMAGE FORMING APPARATUS INCLUDING REMOVAL UNIT FOR REMOVING DEVELOPER

(71) Applicant: Canon Kabushiki Kaisha, Tokyo (JP)

(72) Inventors: Kimitaka Ichinose, Mishima (JP); Kazuhiro Funatani, Mishima (JP); Tetsuichiro Fujimoto, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/085,965

(22) Filed: Nov. 21, 2013

(65) Prior Publication Data

US 2014/0168670 A1   Jun. 19, 2014

(30) Foreign Application Priority Data

Dec. 17, 2012   (JP) .................................. 2012-275098

(51) Int. Cl.
    *G06T 5/00*     (2006.01)
    *H04N 1/04*     (2006.01)
    *G03G 15/00*    (2006.01)
    *G03G 21/00*    (2006.01)

(52) U.S. Cl.
    CPC ............... *H04N 1/04* (2013.01); *G03G 15/50* (2013.01); *G03G 21/0011* (2013.01)

(58) Field of Classification Search
    USPC ............... 358/1.9, 2.1, 2.99, 3.01, 3.26, 1.13; 399/34, 35, 71, 85, 99, 343, 348, 350, 399/359
    See application file for complete search history.

(56) References Cited

U.S. PATENT DOCUMENTS

| 5,303,009 A * | 4/1994 | Nishizawa ...................... 399/71 |
| 5,349,429 A * | 9/1994 | Jugle et al. .................... 399/346 |
| 6,070,047 A | 5/2000 | Ichinose et al. |
| 6,393,250 B1 | 5/2002 | Tsukida et al. |
| 2005/0220513 A1 * | 10/2005 | Curynski et al. .............. 399/346 |
| 2012/0051785 A1 | 3/2012 | Nakai et al. |

FOREIGN PATENT DOCUMENTS

| JP | 2002-323803 A | 11/2002 |
| JP | 2004-126428 A | 4/2004 |

OTHER PUBLICATIONS

U.S. Appl. No. 14/083,650, filed Nov. 19, 2013.

* cited by examiner

*Primary Examiner* — Jamares Q Washington
(74) *Attorney, Agent, or Firm* — Fitzpatrick, Cella, Harper & Scinto

(57) ABSTRACT

An image forming apparatus has a control unit configured to: after an image is formed in a color mode, if an integrated supply amount is larger than or equal to a reference supply amount, cause a supply image with a first amount of developer, otherwise, cause a supply image with a second amount of developer larger that the first amount; and, after an image is formed in the monochrome mode, cause a supply image with a third amount of developer smaller than the first amount, and, to make an interval between recording materials when the supply image with the third amount is formed shorter than an interval between recording materials when the supply image with the first amount or larger is formed.

28 Claims, 13 Drawing Sheets

FIG. 6

```
START
  ↓
CALCULATE PRINT RATIO k(X)                                    — S30
  ↓
DETERMINE SUPPLYING TONER AMOUNT w3
IN ACCORDANCE WITH PRINT RATIO k(X)                           — S31
  ↓
DETERMINE INTERVAL L TO Lm2 IN
ACCORDANCE WITH PRINT RATIO k(X)                              — S32
  ↓
EXECUTE TONER SUPPLY OPERATION                                — S33
  ↓
CALCULATE AND UPDATE
INTEGRATED SUPPLY AMOUNT                                      — S34
  ↓
END
```

FIG. 7

| PRINT RATIO k(X) | <1.0% | 1.0% ≤ k(X) < 3.0% | 3.0% ≤ |
|---|---|---|---|
| SUPPLYING TONER AMOUNT w3 | 0.616mg | 0.440mg | 0mg |
| LENGTH IN SUB-SCANNING DIRECTION | 3.0mm | 1.5mm | 0mm |
| TONER SUPPLY TIME | 15ms | 7.5ms | 0ms |
| INTERVAL Lm2 | 63mm | 61.5mm | 30mm |
| THROUGHPUT | 33.3ppm | 33.5ppm | 36.7ppm |

IMAGE FORMING APPARATUS INCLUDING REMOVAL UNIT FOR REMOVING DEVELOPER

BACKGROUND OF THE INVENTION

1. Field of the Invention

The present disclosure relates to image forming apparatuses using an electrophotographic method or an electrostatic recording method, such as copying machines, printers, and faxes.

2. Description of the Related Art

For example, in an image forming apparatus that forms a toner image on an intermediate transfer belt serving as an image carrier and transfers it onto a recording material, a cleaning unit is provided for removing untransferred toner that is not transferred onto a recording material and remains on the intermediate transfer belt. A rubber cleaning blade, for example, is widely employed as the cleaning unit. If an excessive frictional force acts between the cleaning blade and the image carrier in such an image forming apparatus, the edge of the cleaning blade curls up, which may possibly cause a cleaning defect. The untransferred toner also plays the role of a lubricant for reducing the frictional force between the cleaning blade and the image carrier. However, the frictional force cannot be sufficiently suppressed only with untransferred toner in some cases, and toner is mandatorily supplied to the cleaning unit after printing and before next printing is started. Japanese Patent Laid-Open No. 2002-323803 discloses mandatorily supplying toner to a cleaning blade using a cartridge used in image formation.

Possible exemplary methods for supplying toner to the cleaning blade include a method of temporarily suspending printing every time a predetermined number of sheets are printed and supplying a large amount of toner at that time, and a method of supplying a small amount of toner every time one sheet is printed. However, with the former method, printing is periodically suspended for a long time, and once a toner supply operation starts while several print jobs are being successively performed, a user needs to wait for a long time until printing ends, for example. On the other hand, with the latter method, the toner supply operation is performed every time a recording material is printed, and consequently, throughput during successive printing will decrease. In particular, mass printing is often performed in a monochrome mode in which one color is used for printing, and is significantly affected by reduction in usability due to the toner supply operation.

SUMMARY OF THE INVENTION

According to an aspect of the present invention, an image forming apparatus includes: an image carrier; an image forming unit configured to form an image with developer on the image carrier, and transfer the formed image onto a recording material; a removal unit configured to remove remaining developer that was not transferred from the image carrier onto the recording material; and a control unit configured to cause developer to be supplied to the removal unit by causing the image forming unit to form a supply image that is not to be transferred onto a recording material on the image carrier and causing the removal unit to remove the supply image. The image forming apparatus has a multi-color mode for forming an image using developer of a plurality of colors, and a monochrome mode for forming an image using developer of one color. The control unit is further configured to: after an image is formed in the multi-color mode, if an integrated supply amount, which is an integrated amount of the developer supplied to the removal unit, is larger than or equal to a reference supply amount determined in accordance with an amount of usage of the removal unit, cause a supply image with a first amount of developer to be supplied to the removal unit, and if the integrated supply amount is smaller than the reference supply amount, cause a supply image with a second amount of developer to be supplied to the removal unit, the second amount being larger than the first amount; and, after an image is formed in the monochrome mode, cause a supply image with a third amount of developer to be supplied to the removal unit, the third amount being smaller than the first amount, and, the control unit is further configured to make an interval between a recording material and a subsequently-conveyed recording material when the supply image with the third amount is formed shorter than an interval between a recording material and a subsequently-conveyed recording material when the supply image with the first amount and with an amount that is larger than the first amount is formed.

Further features of the present invention will become apparent from the following description of exemplary embodiments with reference to the attached drawings.

BRIEF DESCRIPTION OF THE DRAWINGS

FIG. 6 is a flowchart showing the details of processing in step S13 in FIG. 2 according to an embodiment;

FIG. 7 is a diagram showing a table stored by a control unit in an embodiment;

DESCRIPTION OF THE EMBODIMENTS

Hereinafter, exemplary embodiments of the present invention will be described with reference to the drawings. Note that constituent elements that are not necessary for the description of the embodiments will be omitted in the diagrams used below.

First Embodiment

Figure 1:
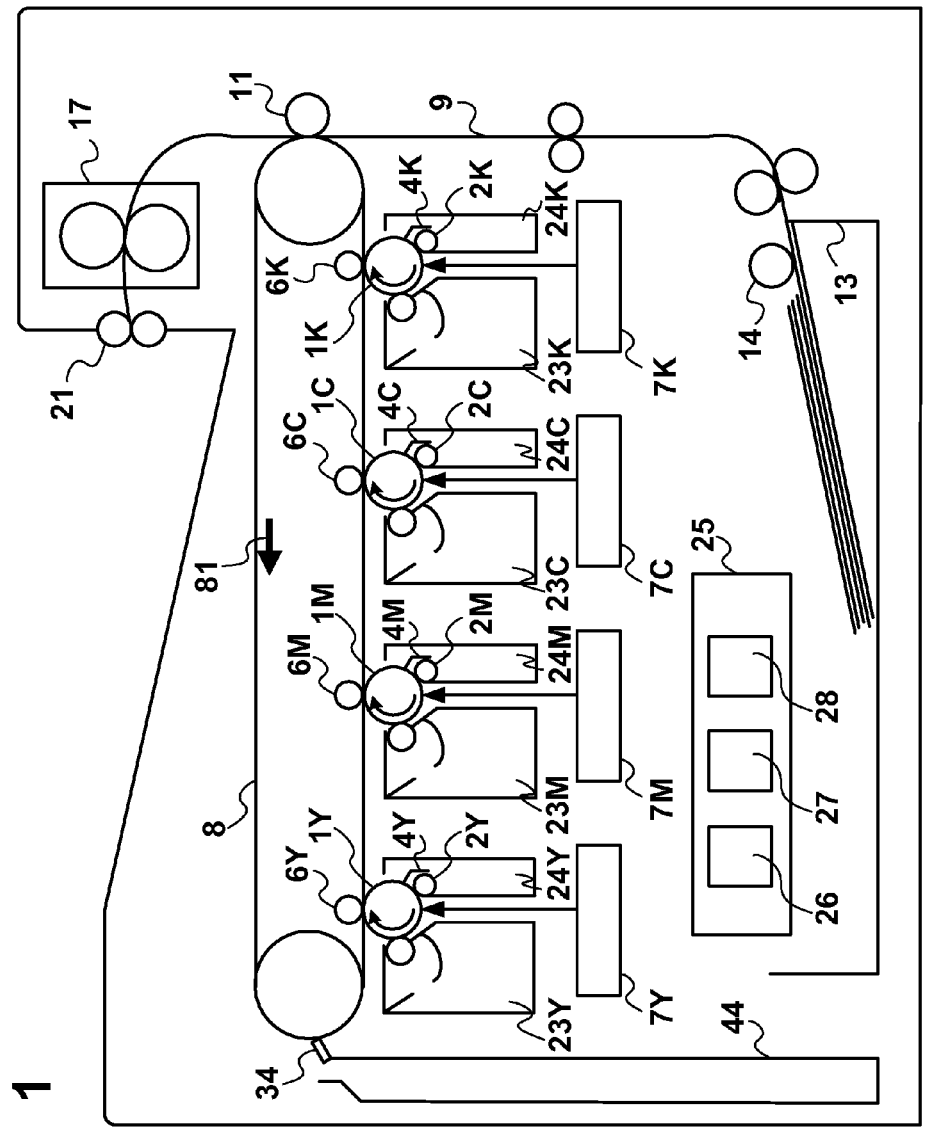
FIG. 1 is a schematic configuration diagram of an image forming apparatus according to an embodiment.

FIG. 1 is a schematic configuration diagram of an image forming apparatus according to the present embodiment. In FIG. 1, members having reference numerals with Y, M, C, and K at the end are members for forming toner images of yellow (Y), magenta (M), cyan (C), and black (K), respectively, on an intermediate transfer belt 8. Note that reference numerals without Y, M, C, and K at the end will be used when colors do not need to be distinguished. Photosensitive members 1, which are image carriers, are driven to rotate in the direction of the arrows in the drawing, and charging units 2 give the surfaces of the corresponding photosensitive members 1 a predetermined potential. Exposure units 7 expose the surface of the corresponding photosensitive members 1 in accordance with an image to be formed and form electrostatic latent images on the surfaces of the photosensitive members 1. Developing units 23 supply toner (developer) of corresponding colors to the electrostatic latent images on the surface of the corresponding photosensitive members 1 by applying a developing bias, and visualize the electrostatic latent images as toner images (developer images). Primary transfer rollers 6 apply a primary transfer bias and transfer the toner images of the corresponding photosensitive members 1 onto the intermediate transfer belt 8 driven to rotate in the direction of an arrow 81. For example, the toner images of the colors of the respective photosensitive members 1Y to 1K are transferred in a superposed manner onto the intermediate transfer belt 8 serving as an image carrier, and a color image is thereby formed. Cleaning blades 4 remove untransferred toner that is not transferred onto the intermediate transfer belt 8 and remains on the photosensitive members 1, and collect it in waste toner containers 24. In the present embodiment, the photosensitive member 1, the charging unit 2, the developing unit 23, the cleaning blade 4, and the waste toner container 24 corresponding to the same color are formed within a single cartridge, and the cartridges of the respective colors are detachable from the image forming apparatus. The cartridge and the exposure unit 7 corresponding to each color constitute an image forming unit for forming an image on the photosensitive member 1 in this cartridge.

A roller 14 sends out a recording material held in a cassette 13 to a conveyance path 9, and a secondary transfer roller 11 applies a secondary transfer bias and transfers the toner image on the intermediate transfer belt 8 onto the recording material. A fixing unit 17 applies heat and pressure to the recording material having the transferred toner image, and fixes the toner image onto the recording material. Thereafter, the recording material is discharged out of the image forming apparatus by a roller pair 21. Note that a cleaning blade 34, which is a cleaning unit, removes untransferred toner that is not transferred from the intermediate transfer belt 8 to the recording material and remains on the intermediate transfer belt 8, and collects it into a waste toner container 44.

A control board 25 includes a CPU 26 serving as a control unit, a nonvolatile memory 27, and a RAM 28. The CPU 26 performs overall control of the operations of the image forming apparatus, such as recording material conveyance control, drive control for each part of the cartridges, image formation control, and control associated with failure detection. The nonvolatile memory 27 holds constants and tables for the control, and the RAM 28 stores various kinds of information that change due to the control performed by the CPU 26. Note that in the present embodiment, information such as an integrated toner amount and the amount of usage of the intermediate transfer belt 8, which will be described later, are stored in the RAM 28.

The image forming apparatus of the present embodiment has two image formation modes, namely a multi-color mode in which images are formed with toner of a plurality of colors, and a monochrome mode in which images are formed only with a single-color toner, e.g., black toner. The CPU 26 selects the image formation mode depending on whether the image to be formed is a color image or a monochrome image, or in accordance with the content of an instruction that is input to the image forming apparatus.

In the monochrome mode, for example, developing rollers of the developing units 23 and the photosensitive members 1 corresponding to unused colors are not driven, and furthermore, the developing rollers and the photosensitive members 1 corresponding to unused colors are separated from each other, and the photosensitive members 1 corresponding to unused colors and the intermediate transfer belt 8 are separated. Note that control in a form different from the above-described form is also possible as long as formation of images of unused colors is disabled.

The cleaning blade 34, which removes untransferred toner on the intermediate transfer belt 8, is made of an elastic rubber such as urethane, and is pressed against the intermediate transfer belt 8 in a direction opposite to rotation at an applied linear pressure of about 0.5 N/cm. In general, a large frictional force is generated between the cleaning blade 34 and the intermediate transfer belt 8. A large frictional force causes distortion in the cleaning blade 34, resulting in a gap between the cleaning blade 34 and the intermediate transfer belt 8, and the necessary cleaning performance may possibly not be achieved due to toner passing through the gap. Further, an edge of the elastic rubber that is brought into contact in the opposite direction may possibly curls up.

To prevent the frictional force between the cleaning blade 34 and the intermediate transfer belt 8 from increasing, powder lubricant can also be applied at the edge portion of the cleaning blade 34. However, the amount of this lubricant gradually decreases as the image forming apparatus is used. The toner also functions as a lubricant, and accordingly, in the present embodiment, a toner supply operation of supplying the toner to the cleaning blade 34 is executed in order to maintain cleaning performance. The CPU 26 executes the toner supply operation while image formation is not performed during successive printing, or after printing processing ends. At this time, the CPU 26 performs control so as to form a toner image having a predetermined length in the sub-scanning direction on the intermediate transfer belt 8, using the entire width in the main scanning direction. Note that in the following description, an image formed during the toner supply operation of supplying toner to the cleaning blade 34 will be referred to as a "supplying toner image" (supplying developer image). Note that the number of colors of the toner used in the supplying toner image may be one or more. Note that since the toner is supplied to the cleaning blade 34 in the toner supply operation, the CPU 26 performs control so as to separate the secondary transfer roller 11 from the intermediate transfer belt 8, or such that the secondary transfer bias has the same polarity as that of the toner. Note that in the following description, it is assumed that the secondary transfer roller 11 applies a secondary transfer bias having the same polarity as that of the toner during the toner supply operation.

Figure 2:
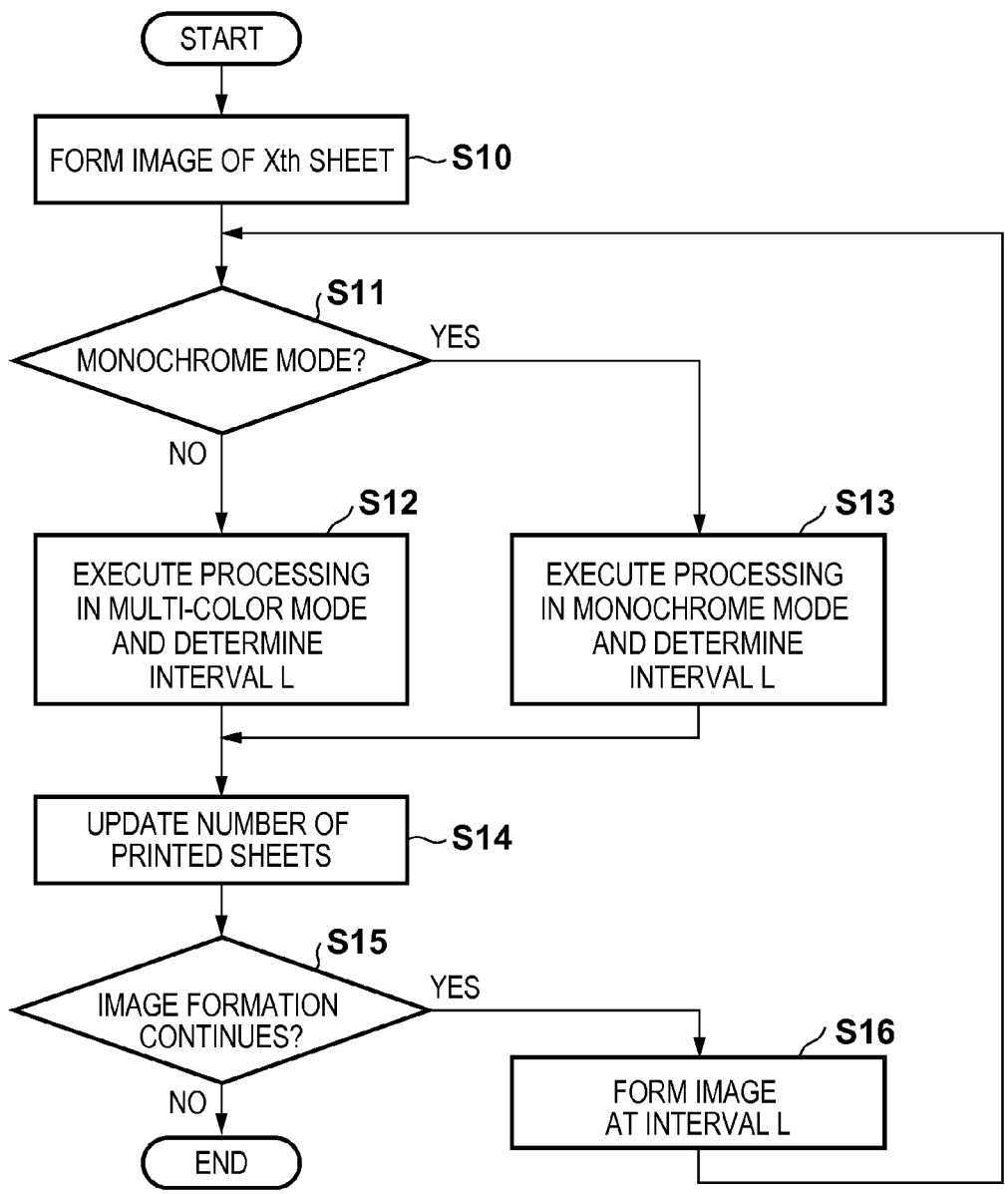
FIG. 2 is a flowchart of printing processing according to an embodiment.

FIG. 2 is a flowchart of printing processing according to the present embodiment. Note that it is assumed that the nonvolatile memory 27 or the RAM 28 (hereinafter referred to collectively as the "memory") stores the number of sheets that have been printed so far, and an integrated supply amount, which is an integrated value of the amount of toner supplied in the toner supply operation so far. Note that the starting point of the number of sheets printed so far and the integrated supply amount can be when the image forming apparatus starts to be used, for example. However, if the intermediate transfer belt 8 and/or the cleaning blade 34 is replaced or undergoes a maintenance task, the number of sheets printed so far and the integrated supply amount can be reset at the time of the replacement or the maintenance work, and the time of the replacement or the maintenance work can be used as a new starting point. In the following description, the number of printed sheets and the integrated supply amount are (X−1) and W(X−1), respectively, at the start of processing in FIG. 2.

Upon printing processing starting, in step S10, the CPU 26 forms an image for the first sheet in this printing processing, that is to say, for the X-th sheet overall. Subsequently, in step S11, the CPU 26 determines whether the image formation mode is the multi-color mode or the monochrome mode. In the case of the multi-color mode, the CPU 26 executes processing in the multi-color mode and determines an interval L in step S12. Note that the details of processing in step S12 will be described later using FIG. 3. In the case of the monochrome mode in step S11, the CPU 26 executes processing in the monochrome mode and determines the interval L in step S13. Note that in the present embodiment, in step S13 the CPU 26 performs only processing for determining the interval L to be Lm. Here, Lm is set to the smallest value at which a recording material S can be stably conveyed. In one example, Lm is 30 mm. In step S14, the CPU 26 updates the number of printed sheets stored in the memory so as to increment it by one, and in step S15, the CPU 26 determines whether or not image formation is to be continued, and ends the printing processing if image formation is not to be continued. On the other hand, if image formation is to be continued, the CPU 26 forms an image to be printed next after the current printing, at the interval L determined in step S12 or S13. Thereafter, processing from step S11 is repeated until the printing ends.

Processing in step S12 in FIG. 2 will be described next using FIG. 3. The CPU 26 reads out the number of printed sheets X−1 and the integrated supply amount W(X−1) from the memory. A toner supply amount w1 that is needed per toner supply operation in order to stabilize cleaning performance is stored in the nonvolatile memory 27. In other words, w1 is the amount of toner (amount of developer) to be supplied to the cleaning blade 34 every time one recording material is printed, in order to stabilize cleaning performance. In step S21, after the printing of (X−1) sheets ends, the CPU 26 calculates a reference supply amount T(X−1), which is an integrated amount of toner that needs to be supplied in order to maintain the stable cleaning performance, using equation (1) below.

$$T(X-1) = w1 \times (X-1) \quad (1)$$

Subsequently, in step S22, the CPU 26 compares the integrated supply amount W(X−1) with the reference supply amount T(X−1). For example, if the integrated supply amount W(X−1) is excessively smaller than the reference supply amount T(X−1), the lubricity decreases, and cleaning performance deteriorates. On the contrary, if the integrated supply amount W(X−1) is excessively larger than the reference supply amount T(X−1), the amount of toner near the cleaning blade 34 is excessive, and cleaning performance may possibly deteriorate due to toner packing or the like. That is to say, cleaning performance can be stabilized at the highest level by performing control for bringing the integrated supply amount W(X−1) as closer as possible to the reference supply amount T(X−1) to the extent that the integrated supply amount W(X−1) does not significantly exceed the reference supply amount T(X−1).

For this reason, in the present embodiment, if the integrated supply amount is larger than or equal to the reference supply amount in step S22, the CPU 26 sets the toner supply amount in the toner supply operation performed after image formation to w1 (first amount) in step S23. On the other hand, if the integrated supply amount is smaller than the reference supply amount, the CPU 26 sets the toner supply amount in the toner supply operation performed after image formation to w2 (second amount), which is larger than w1, in step S24.

Thereafter, the CPU 26 sets the image formation interval L to Lf in step S25, executes the toner supply operation in step S26, and updates the integrated supply amount W(X) in step S27. In the present embodiment, since the toner supply operation is performed for every printing when in the multi-color mode, the interval Lf is longer than the interval Lm in the monochrome mode by the time necessary for performing the toner supply operation. Here, the time necessary for the toner supply operation is the time during which the supplying toner image is formed, or the time necessary for switching the polarity of the transfer bias of the secondary transfer roller 11.

Figure 4A:
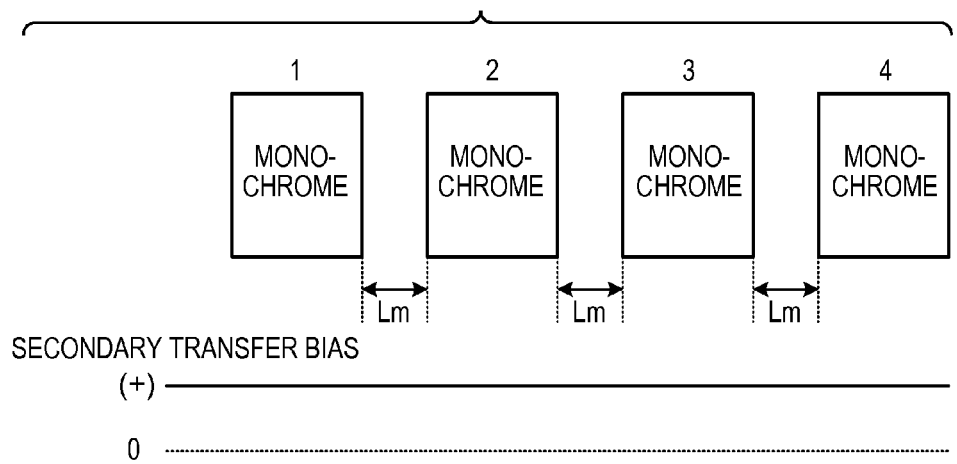
FIGS. 4A and 4B are diagrams showing images formed on an image carrier in an embodiment.
Figure 4B:
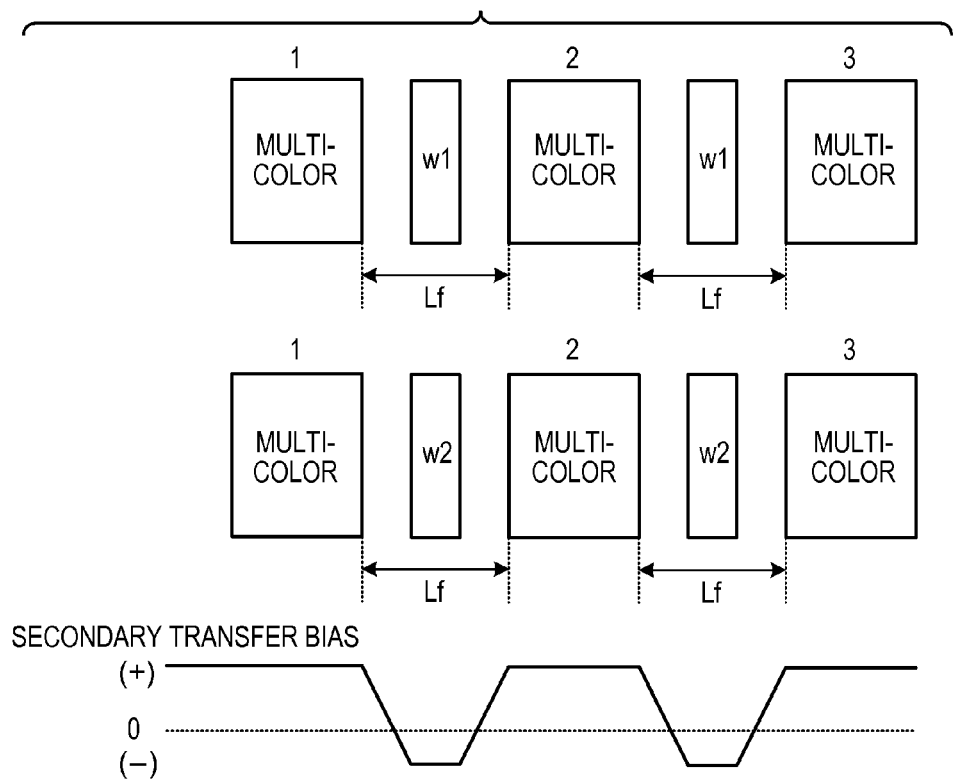

FIG. 4A shows images formed on the intermediate transfer belt 8 and the intervals therebetween when all images are printed in the monochrome mode. Note that reference numerals 1 to 4 in the diagram indicate the numbers of printed sheets in the current printing processing. As shown in FIG. 4A, the interval between print target images, that is to say, between the images transferred onto the recording materials is Lm, and the supplying toner image is not formed. Note that FIG. 4A also shows the secondary transfer bias applied by the secondary transfer roller 11. As shown in FIG. 4A, since the supplying toner image is not formed in the monochrome mode, the bias of the secondary transfer roller 11 remains at positive polarity that is used for transfer. On the other hand, FIG. 4B shows images formed on the intermediate transfer belt 8 and the intervals therebetween when all images are printed in the multi-color mode. Note that reference numerals 1 to 3 in the diagram indicate the numbers of printed sheets in the current printing processing. The upper part indicates the case where the toner supply amount is w1, and the lower part indicates the case where the toner supply amount is w2. As shown in FIG. 4B, the interval between the print target images is Lf, which is larger than Lm, and the supplying toner image is formed within this interval. Further, as shown in FIG. 4B, when the print target image comes to the position of the secondary transfer roller 11, the secondary transfer roller 11 applies a positive secondary transfer bias, and when the supplying toner image comes to the position of the secondary transfer roller 11, it applies a negative secondary transfer bias.

In one example, it is assumed that the supplied toner amount w1 is about 0.7 mg, and the toner amount per unit area is about 0.004 mg/mm$^2$. It is also assumed that the widest width in the main scanning direction is 220 mm. In this case, if a 20% monochrome halftone image whose lengths in the main scanning direction and the sub-scanning direction are 220 mm and 4 mm, respectively, is used as the supplying toner image, 220×4×0.2×0.004=0.704 mg of toner can be supplied. Note that although the toner color to be used is arbitrary, the toner of the least consumed color can be used so as to evenly consume the toner of all colors, for example. Alternatively, the toner whose cartridge was replaced last can be used, which is most effective as lubricant due to less deterioration of the toner therein. Alternatively, the toner of a plurality of colors can be used.

In one example, it is assumed that the supplied toner amount w2 is 1.2 mg at most. This is because, if a large amount of toner is supplied to the cleaning blade 34 at a time, conversely, it may possibly lead to a cleaning defect due to a vibration accompanying sudden torque fluctuation when the toner reaches the cleaning blade 34. Since the supplied toner amount w2 is larger than w1, the density and/or the length in the sub-scanning direction of the supplying toner image to be formed and the number of toner colors to be used when the toner of w2 is supplied are adjusted based on the supplying toner image that is formed when the toner of w1 is supplied. For example, in FIG. 4B, it is assumed that the size of the supplying toner image for supplying the toner of w2 is the same as that in the case of supplying the toner of w1, and the density is 32.5%. Thus, 1.144 mg of toner is supplied.

It is also assumed that the time for switching the polarity of the secondary transfer bias is 0.15 seconds, the length in the sub-scanning direction of the supplying toner image is 4 mm, and the moving speed of the intermediate transfer belt 8 is 200 mm/sec. In this case, the interval Lf needs to be larger than or equal to the following length.

$$Lf = 200 \times 0.15 \times 2 + 4 = 64 \text{ mm}$$

As described above, assuming that the interval Lf in the multi-color mode is 64 mm, throughput in the case of A4-size recording materials in the multi-color mode is $(60 \times 200)/(297 + Lf) = 33.2$ ppm. On the other hand, assuming that the interval Lm in the monochrome mode is 30 mm, the throughput in the case of A4-size recording materials in the monochrome mode is $(60 \times 200)/(297 + Lm) = 36.7$ ppm, and thus, the throughput in the monochrome mode is faster by 3.5 ppm.

Figure 5:
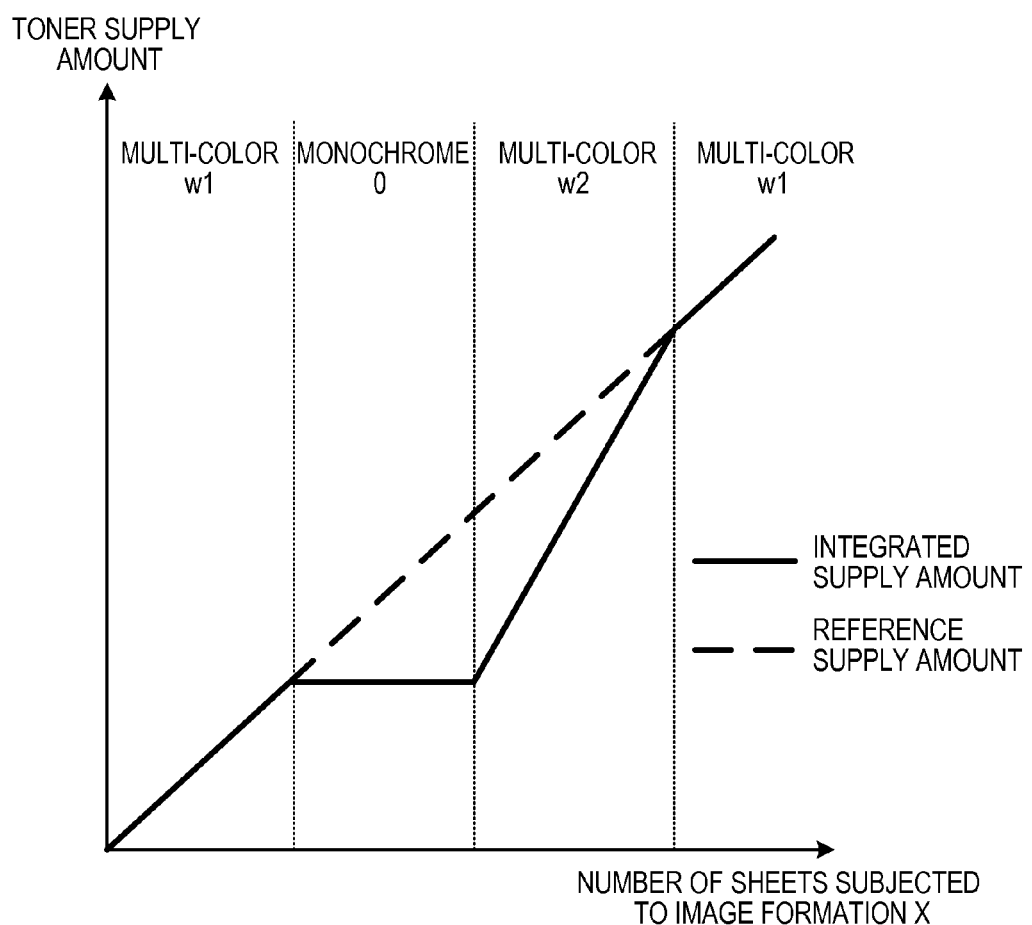
FIG. 5 is a diagram showing an exemplary change in an integrated supply amount according to an embodiment.

FIG. 5 shows an example of transitions in the integrated supply amount when the monochrome mode and the multi-color mode are used in combination. Note that the dotted line in the diagram indicates the reference supply amount, and the solid line indicates the integrated supply amount. Since the supplied toner amount w1 is selected in the first multi-color mode, the integrated supply amount is equal to the reference supply amount. In the subsequent monochrome mode, since the toner supply operation is not performed, the integrated supply amount does not increase, and the integrated supply amount becomes smaller than the reference supply amount. Accordingly, when the multi-color mode is used thereafter, the supplied toner amount w2 is selected. When the multi-color mode is continuously used and the integrated supply amount becomes equal to the reference supply amount, the supplied toner amount w1 is selected, and the integrated supply amount becomes equal to the reference supply amount thereafter.

According to the present embodiment, the toner supply operation is not performed when in the monochrome mode in which mass printing is often performed, and therefore, the interval time when image formation is successively performed can be shortened. Accordingly, it is possible to increase the throughput and improve the usability. However, it is rare in actual use that only the monochrome mode is continuously executed, and normally, the multi-color mode is executed at an appropriate frequency. In the present embodiment, cleaning performance is maintained in the multi-color mode by selecting the supplied toner amount based on the reference supply amount and the integrated supply amount.

Note that the reference supply amount is obtained according to equation (1), based on the number of printed sheets in the present embodiment. However, in the calculation of the reference supply amount, it is possible to use an arbitrary value to serve as an index indicating the used amount of the cleaning blade 34 and/or the intermediate transfer belt 8, such as the integrated length of the intermediate transfer belt 8 cleaned by the cleaning blade 34. Note that the integrated length of the intermediate transfer belt 8 cleaned by the cleaning blade 34 can be obtained using the number of rotations of the intermediate transfer belt 8.

In the above embodiment, the integrated supply amount is obtained only by simply integrating the amount of toner supplied in the toner supply operation. However, untransferred toner also exists that is not transferred onto the recording material and remains on the intermediate transfer belt 8, and such untransferred toner can be taken into account in the calculation of the integrated supply amount. For example, it is assumed that the area of the electrostatic latent images formed for image formation by the exposure units 7 is Ai. Note that in the multi-color mode, Ai is the total area of the electrostatic latent images formed on the respective photosensitive members 1, and in the monochrome mode, Ai is the area of one electrostatic latent image. Assuming that the transfer efficiency is $\alpha$, the untransferred toner can be obtained by multiplying Ai×toner amount per unit area×$\alpha$. Note that the toner amount per unit area is about 0.004 mg/mm$^2$, for example.

With the method of the present embodiment, in practice, the integrated supply amount is larger than the reference supply amount in some cases. In such cases, it is also possible to perform control such that the toner supply operation in a sheet interval after image formation is partially not executed even when in the multi-color mode, giving consideration to deterioration of cleaning performance due to toner packing or the like.

Second Embodiment

In the present embodiment, the toner supply operation is also executed when in the monochrome mode. The present embodiment will be described below, focusing on the difference from the first embodiment. The configuration of an image forming apparatus in the present embodiment is as shown in FIG. 1, and printing processing is as shown in FIG. 2. However, the processing in step S13 in FIG. 2 is different from that in the first embodiment, and will be described below using FIG. 6. Note that in the following description, it is assumed that the ratio of the area Ai of toner portions in formed toner images with respect to the total printable area At of a recording material is a print ratio k. That is to say, $$\text{Print ratio } k = Ai/At$$

Note that the area Ai is the total area of toner portions in the toner images of the respective colors.

In step S30, the CPU 26 calculates the print ratio of the X-th formed image, and determines a supplied toner amount w3 (third amount) in accordance with the print ratio k(X) in step S31. Note that the supplied toner amount w3 is not a fixed value, but can be a different value that changes according to the print ratio as shown in FIG. 7, while being smaller than, or smaller than or equal to the supplied toner amount w1. In FIG. 7, the supplied toner amount w3 is larger as the print ratio k(X) is smaller, and the supplied toner amount w3 is zero when the print ratio k(X) is larger than or equal to a predetermined value (3% in FIG. 7). In the present embodiment, since the toner amount w3 is supplied to the cleaning blade 34, the length in the sub-scanning direction of the supplying toner image is made shorter than the supplying toner image for setting the supplied toner amount to w1, and other values are the same as those of the supplying toner image for setting the supplied toner amount to w1. Subsequently, in step S32, the CPU 26 sets the interval L to Lm2 in accordance with the print ratio k(X). In the present embodiment, the interval Lm2 is not a fixed value either, and is set in accordance with the print ratio k(X), while being smaller than the interval Lf. In step S33, the CPU 26 executes the toner supply operation, and updates the integrated supply amount W(X) in step S34.

Figure 8A:
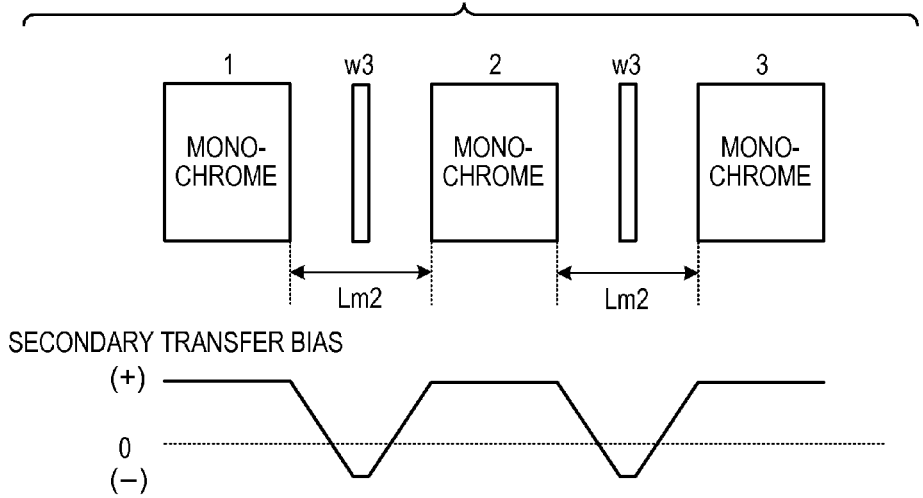
FIGS. 8A and 8B are diagrams showing images formed on an image carrier in an embodiment.
Figure 8B:
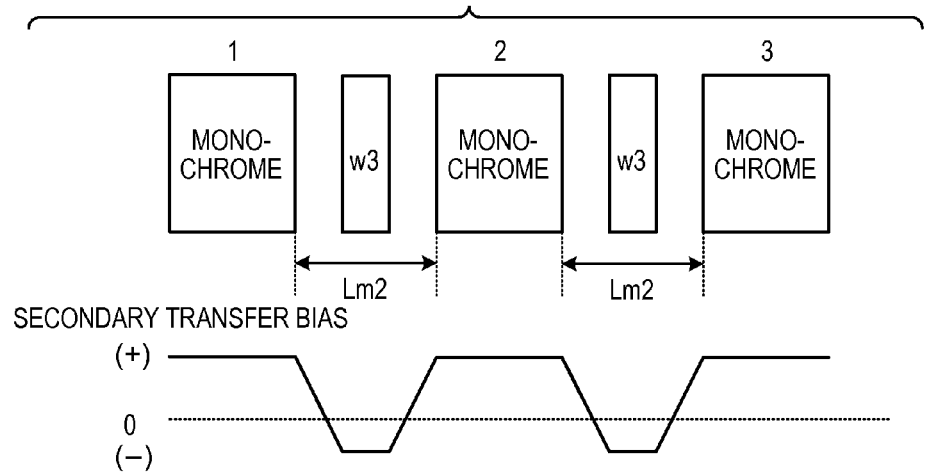

FIG. 8A schematically shows images formed on the intermediate transfer belt 8 and the intervals therebetween in the case where the print ratio is larger than or equal to 1.0% and smaller than 3% with the settings shown in FIG. 7, and FIG. 8B schematically shows images formed on the intermediate transfer belt 8 and the intervals therebetween in the case where the print ratio is smaller than 1.0%. Note that the images formed on the intermediate transfer belt 8 and the intervals therebetween in the case where the print ratio is larger than or equal to 3.0% are the same as those in FIG. 4A.

Figure 9:
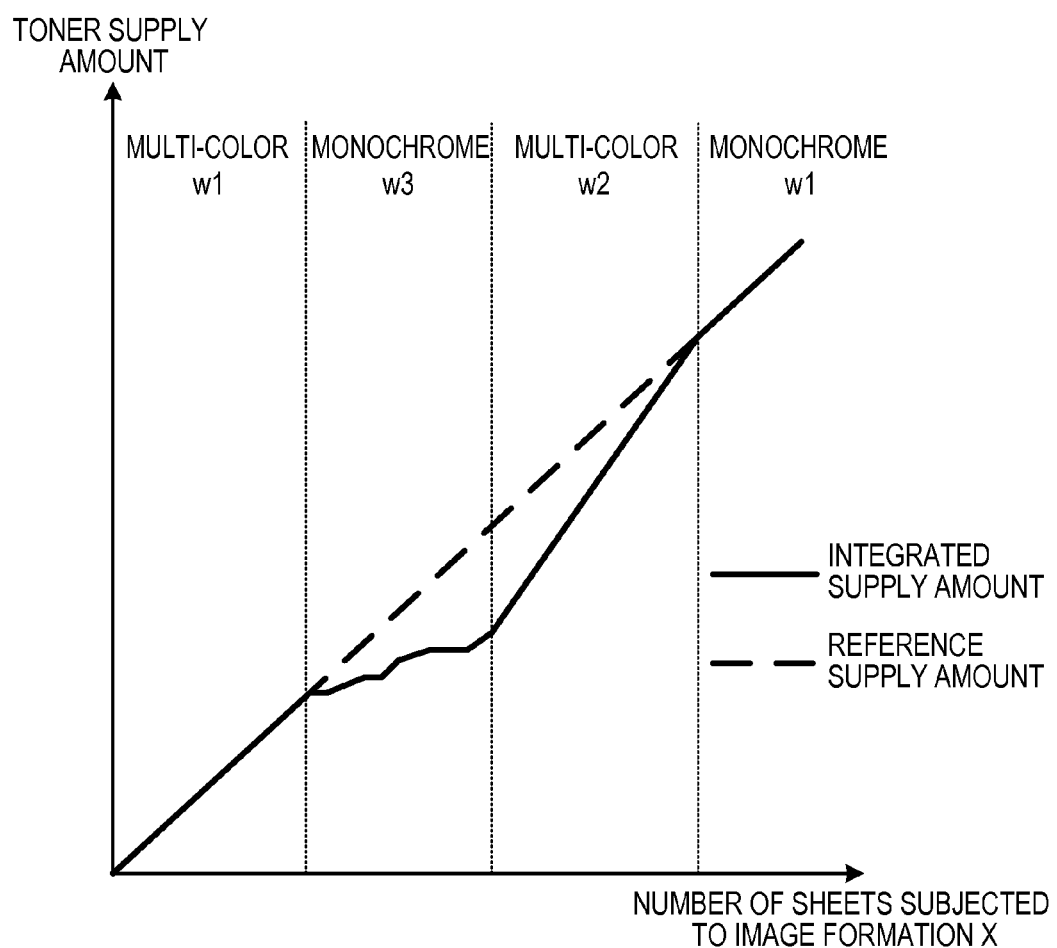
FIG. 9 is a diagram showing exemplary changes in an integrated supply amount according to an embodiment.

FIG. 9 shows an example of transitions in the integrated supply amount when the multi-color mode and the monochrome mode are used in combination in the present embodiment. Note that the dotted line in the diagram indicates the reference supply amount, and the solid line indicates the integrated supply amount. Since the supplied toner amount w1 is selected in the first multi-color mode, the integrated supply amount is equal to the reference supply amount. In the subsequent monochrome mode, the supplied toner amount is determined in accordance with the print ratio, and its value is smaller than the supplied toner amount w1, and the integrated supply amount is smaller than the reference supply amount. Accordingly, when the multi-color mode is used thereafter, the supplied toner amount w2 is selected. When the multi-color mode is continuously used and the integrated supply amount becomes equal to the reference supply amount, the supplied toner amount w1 is selected, and the integrated supply amount becomes equal to the reference supply amount.

A lower print ratio k(X) means that a smaller amount of toner has been consumed in image formation on the X-th sheet, and accordingly, the untransferred toner supplied to the cleaning blade 34 also decreases. For this reason, if a large amount of images with a low print ratio k are formed without the toner supply operation being performed, the amount of toner near the cleaning blade 34 decreases. In the present embodiment, deterioration of cleaning performance can be suppressed even if a large amount of images with a low print ratio k(X) are printed in the monochrome mode. Further, the interval Lm2 is smaller than the interval Lf, and a reduction in the throughput can be suppressed. Note that the first embodiment can be considered as a configuration in which the supplied toner amount w3 in the present embodiment is always 0.

Third Embodiment

Figure 10:
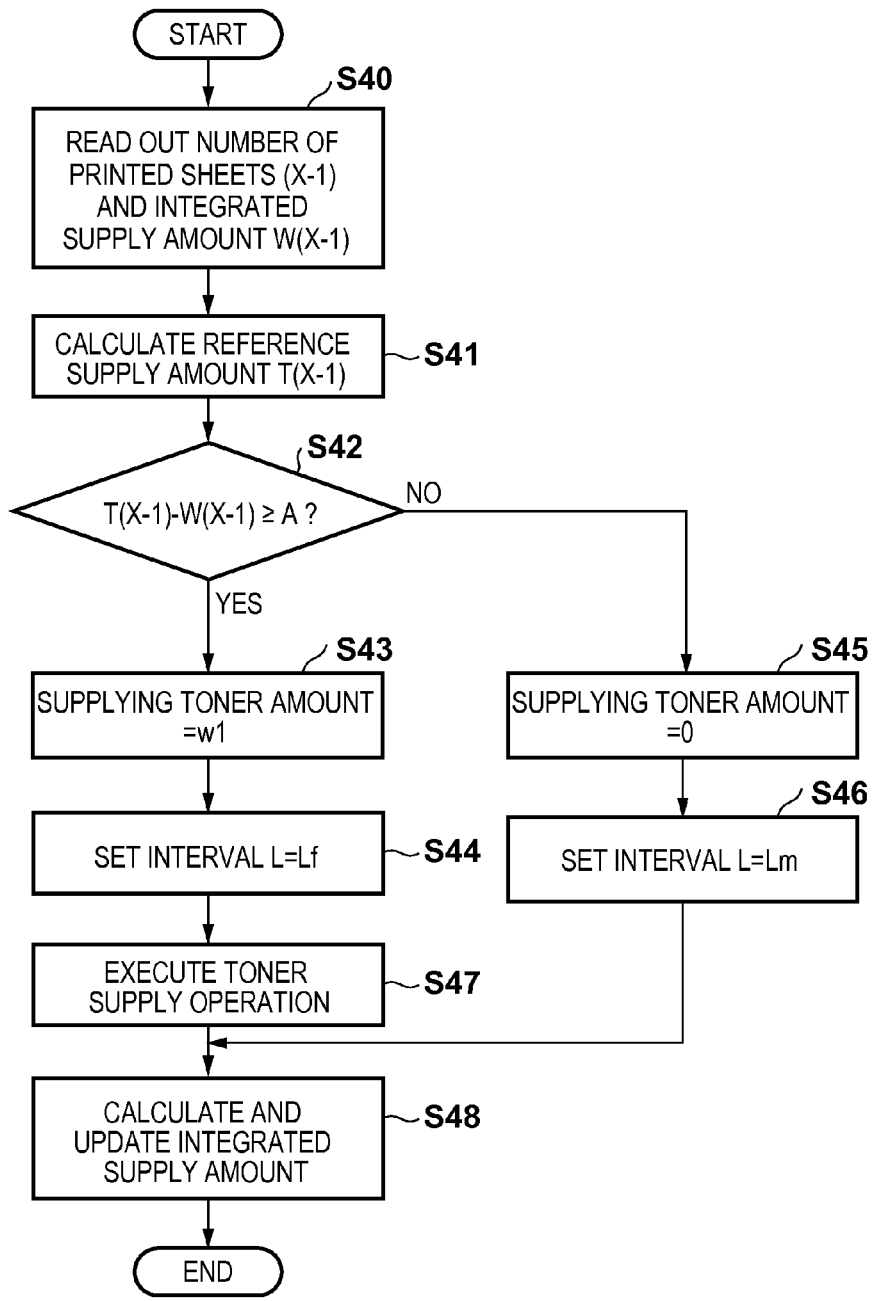
FIG. 10 is a flowchart showing the details of processing in step S13 in FIG. 2 according to an embodiment.

The present embodiment will be described below, focusing on the difference from the first embodiment. The configuration of an image forming apparatus in the present embodiment is as shown in FIG. 1, and printing processing is as shown in FIG. 2. However, the processing in step S13 in FIG. 2 is different from that in the first embodiment, and will be described below with reference to FIG. 10.

Figure 3:
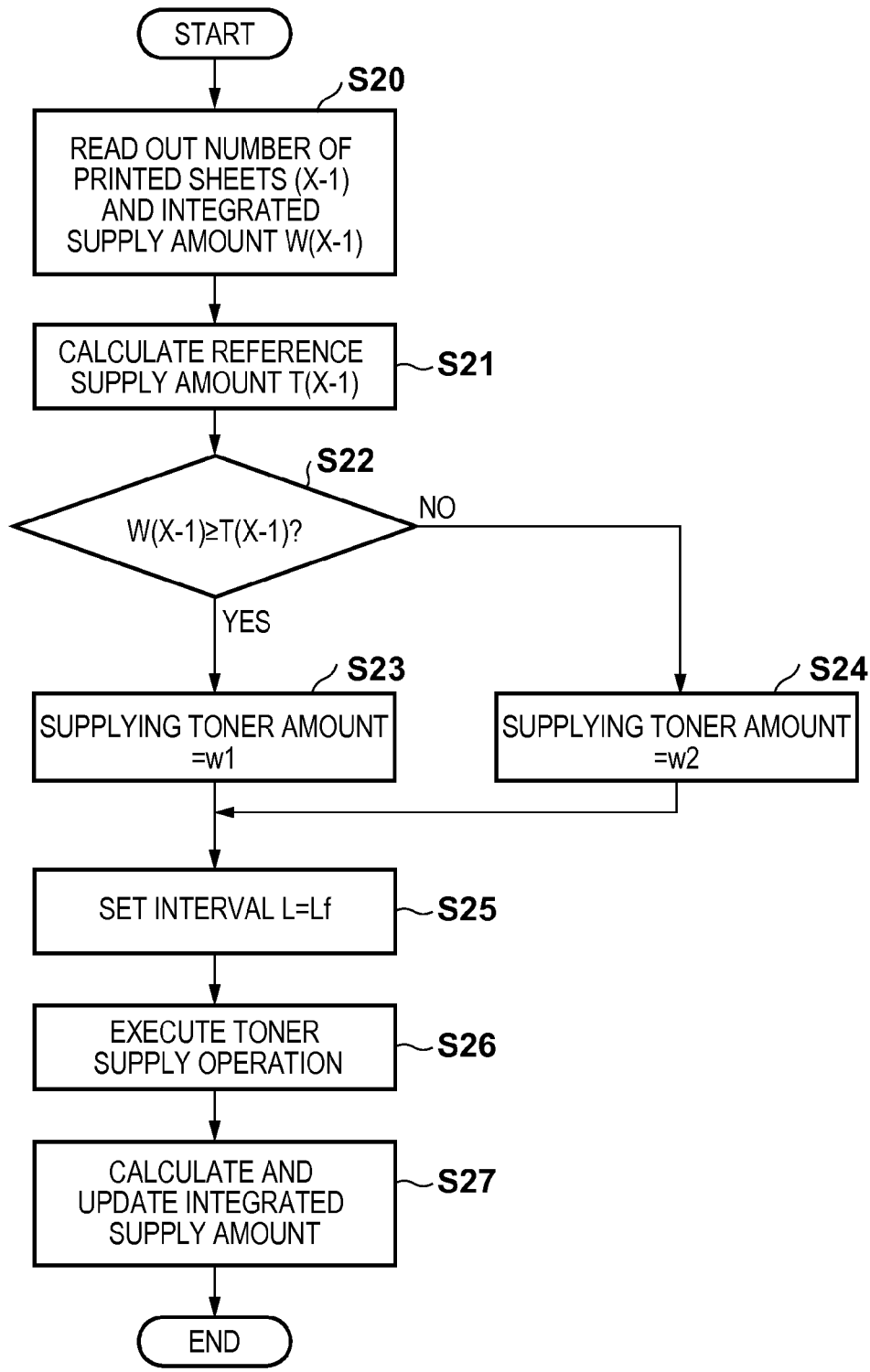
FIG. 3 is a flowchart showing the details of processing in step S12 in FIG. 2 according to an embodiment.

The processing in steps S40 and S41 is the same as the processing in steps S20 and S21 in FIG. 3, and the description thereof will be omitted. In step S42, the CPU 26 determines whether or not the amount obtained by subtracting the integrated supply amount W(X−1) from the reference supply amount T(X−1) is larger than or equal to an acceptable amount A. Note that the acceptable amount A is also stored in the nonvolatile memory 27. If it is smaller than the acceptable amount, the CPU 26 sets the supplied toner amount to 0 in step S45 as in the first embodiment, and sets the interval L to Lm in step S46. On the other hand, if the amount in step S42 is larger than or equal to the acceptable amount, the CPU 26 sets the supplied toner amount to w1 in step S43, and sets the interval L to Lf in step S44. Subsequently, the CPU 26 executes the toner supply operation in step S47, and updates the integrated supply amount in step S48.

Figure 11:
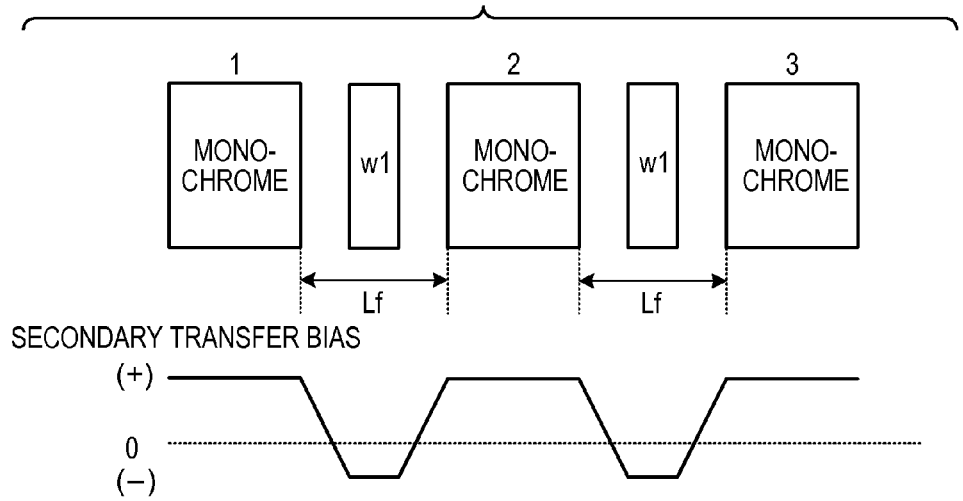
FIG. 11 is a diagram showing images formed on an image carrier in an embodiment.

FIG. 11 shows images formed on the intermediate transfer belt 8 and the intervals therebetween when the supplied toner amount is w1 in the monochrome mode in the present embodiment. Note that if the supplied toner amount is 0, the images and intervals in the monochrome mode are as shown in FIG. 4A, and those in the multi-color mode are as shown in FIG. 4B.

Figure 12:
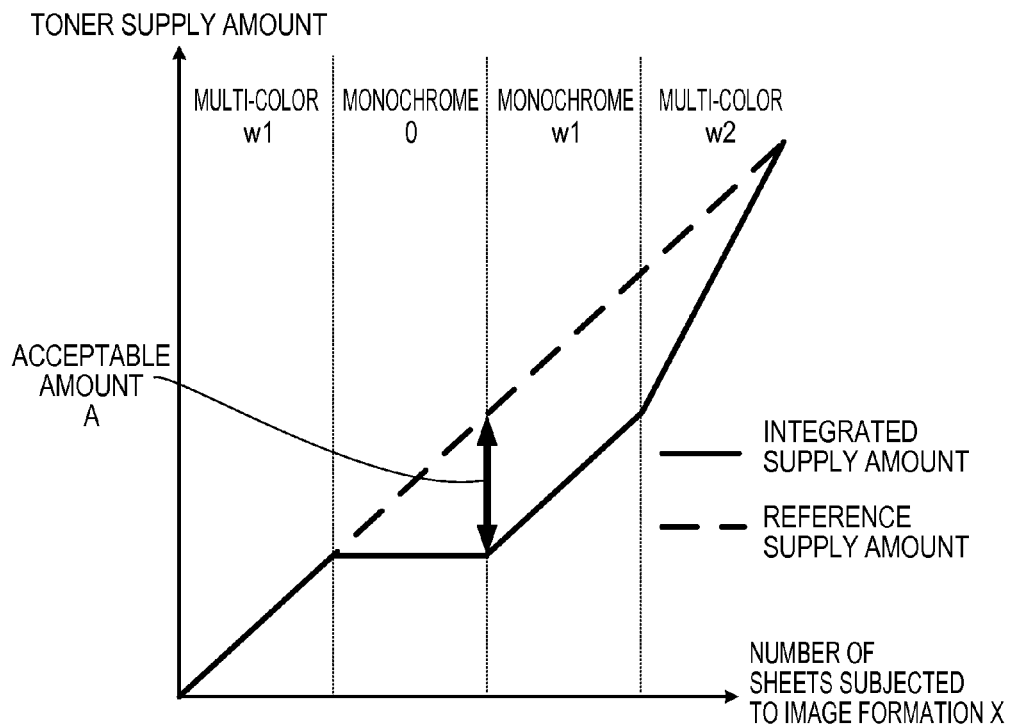
FIG. 12 is a diagram showing exemplary changes in an integrated supply amount according to an embodiment.

FIG. 12 shows an example of transitions in the integrated supply amount when the multi-color mode and the monochrome mode are used in combination in the present embodiment. Note that the dotted line in the diagram indicates the reference supply amount, and the solid line indicates the integrated supply amount. Since the supplied toner amount w1 is selected in the first multi-color mode, the integrated supply amount is equal to the reference supply amount. When the monochrome mode is used thereafter, the supplied toner amount is 0 since the difference between the integrated supply amount and the reference supply amount is 0, and the difference between the integrated supply amount and the reference supply amount increases. Thereafter, the supplied toner amount becomes w1 when the difference between the integrated supply amount and the reference supply amount reaches the acceptable amount A, and the difference between the integrated supply amount and the reference supply amount is kept at the acceptable amount A while in the monochrome mode. When the multi-color mode is used thereafter, the supplied toner amount w2 is selected. When the multi-color mode is continuously used and the integrated supply amount becomes equal to the reference supply amount, the supplied toner amount w1 is selected, and the integrated supply amount is equal to the reference supply amount thereafter.

The present embodiment has an advantage in that even if the monochrome mode is continuously used, the difference between the integrated supply amount and the reference supply amount can be prevented from exceeding the acceptable amount A, in addition to the advantages of the above embodiments. Note that the present embodiment can also be configured such that the toner supply operation is executed when in the monochrome mode at the supplied toner amount w3 in accordance with the print ratio, as in the second embodiment.

Fourth Embodiment

The present embodiment will be described below, focusing on the difference from the first embodiment. The configuration of an image forming apparatus in the present embodiment is as shown in FIG. 1, and printing processing is as shown in FIG. 2. However, processing in steps S12 and S13 in FIG. 2 is different from that in the first embodiment, and will be described below using FIGS. 13 and 14.

Figure 13:
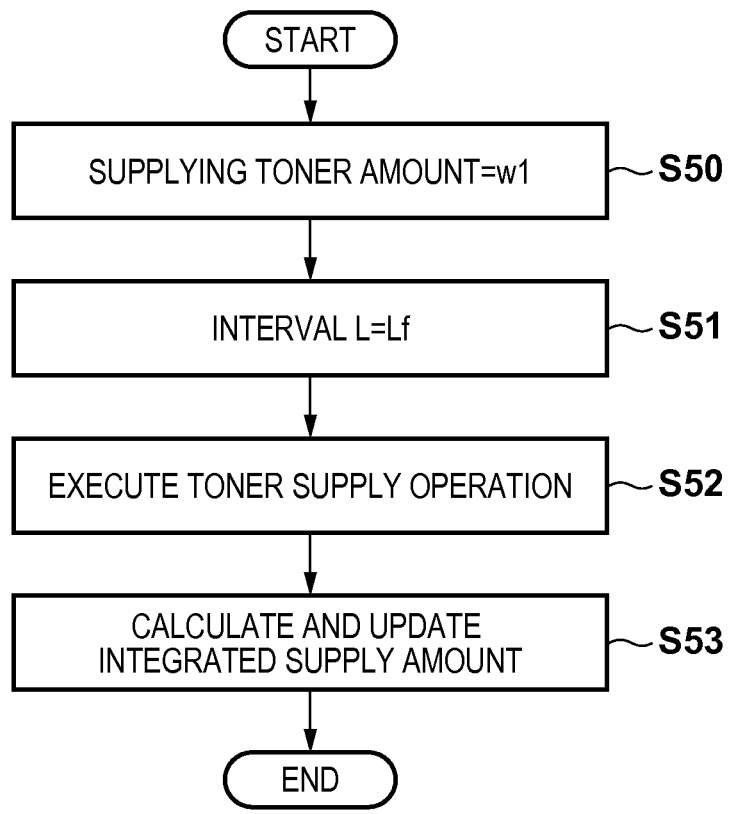
FIG. 13 is a flowchart showing the details of processing in step S12 in FIG. 2 according to an embodiment.

FIG. 13 shows the details of processing in step S12 in FIG. 2. The CPU 26 sets the supplied toner amount to w1 in step S50, and sets the interval L to Lf in step S51. Subsequently, the CPU 26 executes the toner supply operation in step S52, and updates the integrated supply amount in step S53. Thus, in the present embodiment, the supplied toner amount is always set to w1 and the interval L is always set to Lf in the multi-color mode.

Figure 14:
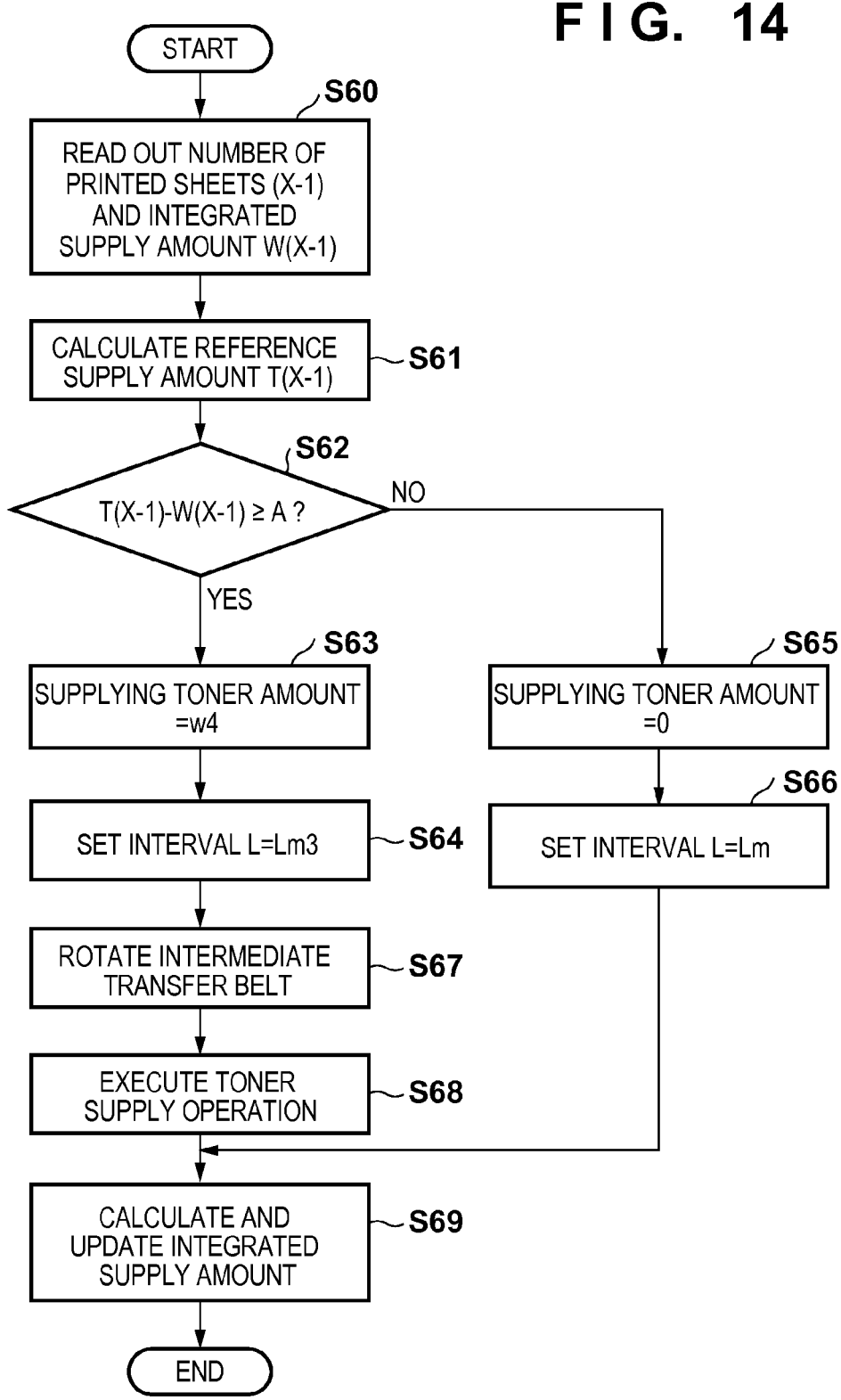
FIG. 14 is a flowchart showing the details of processing in step S13 in FIG. 2 according to an embodiment.

FIG. 14 shows the details of processing in step S13 in FIG. 2. The processing in steps S60 and S61 is the same as the processing in steps S20 and S21 in FIG. 3, and the description thereof will be omitted. In step S62, the CPU 26 determines whether or not the value obtained by subtracting the integrated supply amount W(X−1) from the reference supply amount T(X−1) is larger than or equal to the acceptable amount A. If the value is not larger than or equal to the acceptable amount A, the CPU 26 sets the supplied toner amount to 0 in step S65 as in the first embodiment, and sets the interval L to Lm in step S66. On the other hand, if the value in step S62 is larger than or equal to the acceptable amount A, the CPU 26 sets the supplied toner amount to w4 in step S63, and sets the interval L to Lm3 in step S64. Here, the supplied toner amount w4 is substantially the same amount as the acceptable amount A. In other words, the supplied toner amount w4 is an amount that makes the difference between the reference supply amount and the integrated supply amount smaller than a predetermined amount. As described in the first embodiment, if the supplied toner amount is too large, a cleaning defect may possibly occur due to a vibration accompanying a sudden torque fluctuation when the toner reaches the cleaning blade 34. Accordingly, in the present embodiment, the intermediate transfer belt 8 is rotated at least once in step S67 such that even if a cleaning defect is caused, the toner is collected again by the cleaning blade 34. Accordingly, the value of interval Lm3 is set to a length that is the sum of the length that enables formation of a supplying toner image and switching of the secondary transfer bias and the circumferential length of the intermediate transfer belt 8. Subsequently, the CPU 26 executes the toner supply operation in step S68, and updates the integrated supply amount in step S69.

For example, it is assumed that the acceptable amount A is 140 mg, and the supplied toner amount w4 is 139.9 mg. A solid image having a 220-mm length in the main scanning direction and a 159-mm length in the sub-scanning direction is used as the supplying toner image for supplying the toner amount w4. In this case, assuming that the toner amount per unit area is 0.004 mg/mm$^2$, 220×159×1.0×0.004=139.9 mg of toner can be supplied. Here, assuming that the circumferential length of the intermediate transfer belt 8 is 750 mm, the moving speed of the intermediate transfer belt 8 is 200 mm/sec., and the time for switching the polarity of the secondary transfer bias is 150 ms, the interval Lm3 is (200× 0.15)+159+750=939 mm. In the present embodiment, if the number of sheets corresponding to (acceptable amount A/w1) is successively printed in the monochrome image, the toner supply operation is executed at the supplied toner amount w4.

Figure 15:
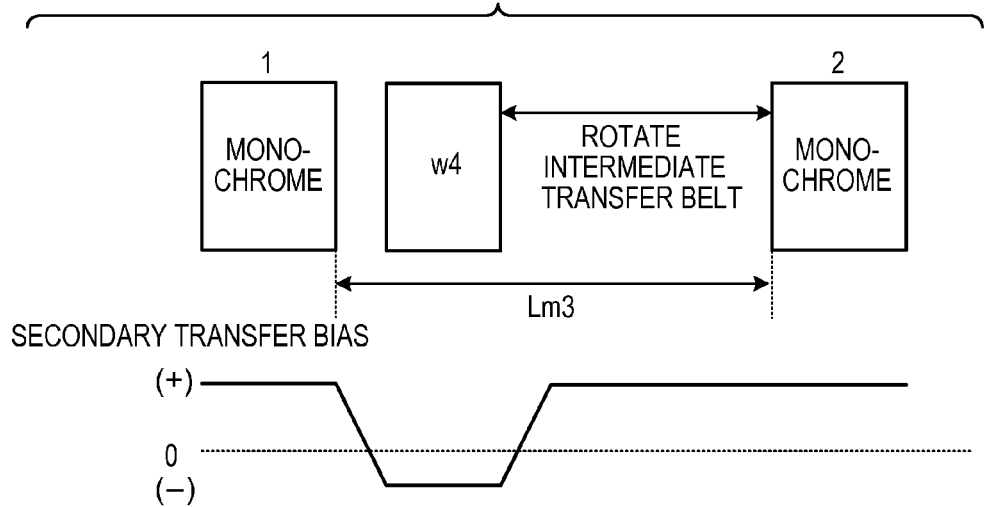
FIG. 15 is a diagram showing images formed on an image carrier in an embodiment.

FIG. 15 shows images formed on the intermediate transfer belt 8 and the interval therebetween when the supplied toner amount is w4 in the monochrome mode in the present embodiment. As shown in FIG. 15, the interval between the supplying toner image for supplying the toner amount w4 and the print target toner image to be formed next is larger than or equal to the circumferential length of the intermediate transfer belt 8. Note that if the supplied toner amount is 0, the images and intervals in the monochrome mode are as shown in FIG. 4A, and those in the multi-color mode are as in the case where the supplied toner amount is w1 in FIG. 4B.

Figure 16:
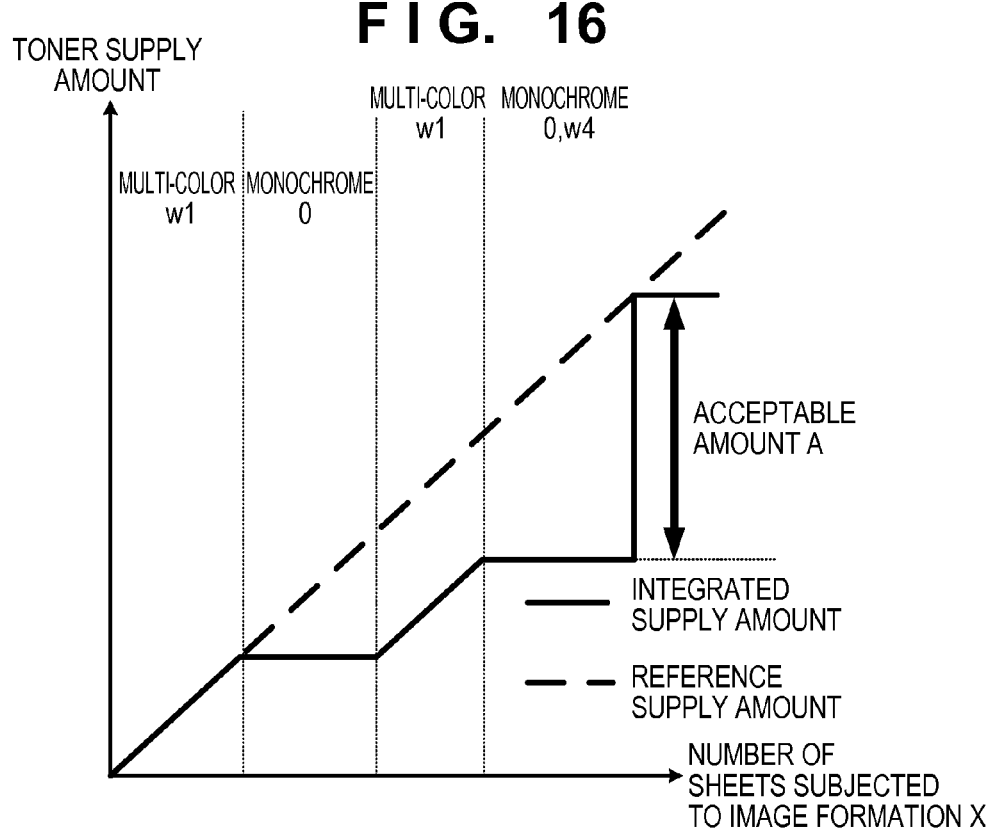
FIG. 16 is a diagram showing exemplary changes in an integrated supply amount according to an embodiment.

FIG. 16 shows an example of transitions in the integrated supply amount when the multi-color mode and the monochrome mode are used in combination in the present embodiment. Since the supplied toner amount w1 is selected in the first multi-color mode, the integrated supply amount is equal to the reference supply amount. When the monochrome mode is used thereafter, the supplied toner amount is 0 since the difference between the integrated supply amount and the reference supply amount is 0, and the difference between the integrated supply amount and the reference supply amount increases. When the multi-color image is used subsequently, the supplied toner amount becomes w1, and the difference between the integrated supply amount and the reference supply amount transitions at a constant amount. Thereafter, when the monochrome mode is used again, the supplied toner amount is 0 since the difference between the integrated supply amount and the reference supply amount is smaller than the acceptable amount A, and the difference between the integrated supply amount and the reference supply amount increases. Thereafter, when the difference between the integrated supply amount and the reference supply amount reaches the acceptable amount A, the supplied toner amount becomes w4, the difference between the integrated supply amount and the reference supply amount becomes substantially 0, and accordingly, the supplied toner amount is 0 again.

In the present embodiment, in the monochrome mode in which mass printing is often performed, normally the toner supply operation is not performed, and it is therefore possible to shorten the interval time when image formation is successively performed, and improve throughput and usability. On the other hand, if the difference between the integrated supply amount and the reference supply amount is compared with the acceptable amount A and the difference therebetween reaches the acceptable amount A, an amount of toner that is substantially equal to the acceptable amount A is supplied, thereby enabling prevention of deterioration of cleaning performance.

Note that although the supplied toner amount in step S65 in FIG. 14 is 0 in the present embodiment, a configuration is possible in which the toner supply operation is executed at the supplied toner amount w3 in accordance with the print ratio, as in the second embodiment. Deterioration of throughput can be suppressed by making the interval Lm for the supplied toner amount w3 including zero smaller than the interval used when the supplied toner amount is w1 or larger. Further, although the supplied toner amount in the multi-color mode is always w1 in the present embodiment, a configuration is also possible in which the supplied toner amount is switched between w1 and w2, as in the first embodiment. Furthermore, although the supplied toner amount w4 in step S63 is an amount based on the value obtained by subtracting the integrated supply amount from the reference supply amount in the present embodiment, a configuration may also be employed in which the supplied toner amount w4 is an arbitrary value larger than the supplied toner amount w1.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275098, filed on Dec. 17, 2012, which is hereby incorporated by reference herein in its entirety.

What is claimed is:

1. An image forming apparatus comprising:

an image carrier;

an image forming unit configured to form an image with developer on the image carrier, and transfer the formed image onto a recording material;

a removal unit configured to remove remaining developer that was not transferred from the image carrier onto the recording material; and a control unit configured to cause developer to be supplied to the removal unit by causing the image forming unit to form a supply image that is not to be transferred onto a recording material on the image carrier and causing the removal unit to remove the supply image, wherein the image forming apparatus is adapted to form an image according to a multi-color mode using developer of a plurality of colors, or a monochrome mode using developer of one color, the control unit is further configured to: after an image is formed in the multi-color mode, if an integrated supply amount, which is an integrated amount of the developer supplied to the removal unit, is larger than or equal to a reference supply amount determined in accordance with an amount of usage of the removal unit, cause a supply image with a first amount of developer to be supplied to the removal unit, and if the integrated supply amount is smaller than the reference supply amount, cause a supply image with a second amount of developer to be supplied to the removal unit, the second amount being larger than the first amount; and, after an image is formed in the monochrome mode, cause a supply image with a third amount of developer to be supplied to the removal unit, the third amount being smaller than the first amount, and the control unit is further configured to make an interval between a recording material and a subsequently-conveyed recording material when the supply image with the third amount is formed shorter than an interval between a recording material and a subsequently-conveyed recording material when the supply image with the first amount or with an amount that is larger than the first amount is formed.

2. The image forming apparatus according to claim 1, wherein the first amount is the amount of developer that is to be supplied to the removal unit with respect to an increase in the amount of usage of the removal unit.

3. The image forming apparatus according to claim 1, wherein the control unit is further configured to, after an image is formed in the monochrome mode, if an amount obtained by subtracting the integrated supply amount from the reference supply amount is larger than or equal to a predetermined acceptable amount, supply the supply image with the first amount of developer to the removal unit, and if the amount obtained by the subtraction is smaller than the acceptable amount, supply the supply image with the third amount of developer to the removal unit.

4. The image forming apparatus according to claim 1, wherein the control unit is further configured to, after an image is formed in the monochrome mode, if an amount obtained by subtracting the integrated supply amount from the reference supply amount is larger than or equal to a predetermined acceptable amount, supply the supply image with an amount that is larger than the first amount of developer to the removal unit, and if the amount obtained by the subtraction is smaller than the acceptable amount, supply the supply image with the third amount of developer to the removal unit.

5. The image forming apparatus according to claim 4, wherein if the amount obtained by the subtraction is larger than or equal to the acceptable amount, the control unit is further configured to supply the supply image to the removal unit such that a difference between the reference supply amount and the integrated supply amount is smaller than a predetermined amount.

6. The image forming apparatus according to claim 1, wherein the reference supply amount is obtained using a product of the first amount and the number of printed sheets.

7. The image forming apparatus according to claim 1, wherein the reference supply amount is obtained using an integrated length of a surface of the image carrier from which the developer has been removed by the removal unit.

8. The image forming apparatus according to claim 1, wherein the third amount is determined in accordance with a print ratio that is a ratio of an area of an image formed on a recording material subjected to image formation with respect to an area of an image that can be formed on the recording material.

9. The image forming apparatus according to claim 1, wherein the third amount is zero.

10. The image forming apparatus according to claim 1, wherein the control unit is further configured to adjust an amount of developer that is to be supplied to the removal unit, depending on a length in a sub-scanning direction of the supply image.

11. The image forming apparatus according to claim 1, wherein the control unit is further configured to adjust an amount of developer that is to be supplied to the removal unit, depending on a density of the supply image.

12. The image forming apparatus according to claim 1, wherein the control unit is further configured to adjust an amount of developer that is to be supplied to the removal unit, depending on the number of colors of developer used in the supply image.

13. An image forming apparatus comprising:

an image carrier;

an image forming unit configured to form an image with developer on the image carrier, and transfer the formed image onto a recording material;

a removal unit configured to remove remaining developer that was not transferred from the image carrier onto the recording material; and a control unit configured to cause developer to be supplied to the removal unit by causing the image forming unit to form a supply image that is not to be transferred onto a recording material on the image carrier and causing the removal unit to remove the supply image, wherein the image forming apparatus is adapted to form an image according to a multi-color mode using developer of a plurality of colors, or a monochrome mode using developer of one color, the control unit is further configured to, after an image is formed in the multi-color mode, cause a supply image with a first amount of developer to be supplied to the removal unit; and, after an image is formed in the monochrome image, if an amount obtained by subtracting an integrated supply amount, which is an integrated amount of developer supplied to the removal unit, from a reference supply amount determined in accordance with an amount of usage of the removal unit is larger than or equal to a predetermined acceptable amount, cause a supply image with an amount that is larger than the first amount of developer to be supplied to the removal unit, and if the amount obtained by the subtraction is smaller than the acceptable amount, cause a supply image with a third amount of developer to be supplied to the removal unit, the third amount being smaller than the first amount, and the control unit is further configured to make an interval between a recording material and a subsequently-conveyed recording material when the supply image with the third amount is formed shorter than an interval between a recording material and a subsequently-conveyed recording material when the supply image with the first amount or with an amount that is larger than the first amount is formed.

14. The image forming apparatus according to claim 13, wherein the first amount is the amount of developer that is to be supplied to the removal unit with respect to an increase in the amount of usage of the removal unit.

15. The image forming apparatus according to claim 13, wherein if the amount obtained by the subtraction is larger than or equal to the acceptable amount, the control unit is further configured to supply a supply image to the removal unit such that a difference between the reference supply amount and the integrated supply amount is smaller than a predetermined amount.

16. The image forming apparatus according to claim 15, wherein the control unit is further configured to make an interval between a supply image for supplying developer to the removal unit and an image to be transferred onto a recording material next larger than or equal to a circumferential length of the image carrier such that a difference between the reference supply amount and the integrated supply amount is smaller than a predetermined amount.

17. The image forming apparatus according to claim 13, wherein the reference supply amount is obtained using a product of the first amount and the number of printed sheets.

18. The image forming apparatus according to claim 13, wherein the reference supply amount is obtained using an integrated length of a surface of the image carrier from which the developer has been removed by the removal unit.

19. The image forming apparatus according to claim 13, wherein the third amount is determined in accordance with a print ratio that is a ratio of an area of an image formed on a recording material subjected to image formation with respect to an area of an image that can be formed on the recording material.

20. The image forming apparatus according to claim 13, wherein the third amount is zero.

21. The image forming apparatus according to claim 13, wherein the control unit is further configured to adjust an amount of developer that is to be supplied to the removal unit, depending on a length in a sub-scanning direction of the supply image.

22. The image forming apparatus according to claim 13, wherein the control unit is further configured to adjust an amount of developer that is to be supplied to the removal unit, depending on a density of the supply image.

23. The image forming apparatus according to claim 13, wherein the control unit is further configured to adjust an amount of developer that is to be supplied to the removal unit, depending on the number of colors of developer used in the supply image.

24. An image forming apparatus comprising:
an image carrier;
an image forming unit configured to form an image with developer on the image carrier, and transfer the formed image onto a recording material;
a removal unit configured to remove remaining developer that was not transferred from the image carrier onto the recording material; and
a control unit configured to cause developer to be supplied to the removal unit by causing the image forming unit to form a supply image that is not to be transferred onto a recording material on the image carrier and causing the removal unit to remove the supply image,
wherein the image forming apparatus is adapted to form an image according to a multi-color mode using developer of a plurality of colors, or a monochrome mode using developer of one color, and
the control unit is further configured to cause developer to be supplied to the removing unit by causing the image forming unit to form a first supply image subsequently after forming the image by the multi-color mode or by causing the image forming unit to form a second supply image after forming the image by the monochrome mode,
wherein an amount of developer for the second supply image is smaller than an amount of developer for the first supply image.

25. An image forming apparatus comprising:
an image carrier;
an image forming unit configured to form an image with developer on the image carrier, and transfer the formed image onto a recording material;
a removal unit configured to remove remaining developer that was not transferred from the image carrier onto the recording material; and
a control unit configured to cause developer to be supplied to the removal unit by causing the image forming unit to form a supply image that is not to be transferred onto a recording material on the image carrier and causing the removal unit to remove the supply image,
wherein the image forming apparatus is adapted to form an image according to a multi-color mode using developer of a plurality of colors, or a monochrome mode using developer of one color, and
the control unit is further configured to cause the image forming unit to form the supply image subsequently after forming the image by the multi-color mode, without forming the supply image after forming the image by the monochrome mode.

26. An image forming apparatus comprising:
an image carrier;
an image forming unit configured to form an image with developer on the image carrier, and transfer the formed image onto a recording material;
a removal unit configured to remove remaining developer that was not transferred from the image carrier onto the recording material; and
a control unit configured to cause developer to be supplied to the removal unit by causing the image forming unit to form a supply image that is not to be transferred onto a recording material on the image carrier and causing the removal unit to remove the supply image, wherein the image forming apparatus is adapted to form an image according to a multi-color mode using developer of a plurality of colors, or a monochrome mode using developer of one color, the control unit is further configured to cause the image forming unit to form the supply image subsequently after forming the image by the multi-color mode or the monochrome mode, and wherein the control unit is further configured to control an amount of developer for the supply image, in accordance with whether the image is formed by the multi-color mode or the monochrome mode.

27. An image forming apparatus comprising:

an image carrier;

an image forming unit configured to form an image with developer on the image carrier, and transfer the formed image onto a recording material;

a removal unit configured to remove remaining developer that was not transferred from the image carrier onto the recording material; and a control unit configured to cause developer to be supplied to the removal unit by causing the image forming unit to form a supply image that is not to be transferred onto a recording material on the image carrier and causing the removal unit to remove the supply image, wherein the control unit is further configured to cause the image forming unit to form the supply image subsequently after forming the image, and wherein the control unit is further configured to control an amount of developer for the supply image, in accordance with an amount of developer for the formed image.

28. The image forming apparatus according to claim 27, wherein the control unit is further configured to cause the image forming unit to form a first supply image with a first developer amount after forming a first image with a second developer amount, and to cause the image forming unit to form a second supply image with a third developer amount after forming a second image with a fourth developer amount, and wherein the third developer amount is larger than the first developer amount, and the fourth developer amount is smaller than the second developer amount.

* * * * *